(12) United States Patent
El-Habnouni et al.

(10) Patent No.: US 11,504,689 B2
(45) Date of Patent: Nov. 22, 2022

(54) ENCAPSULATED PERFUME COMPOSITIONS AND METHODS OF PREPARING THEM

(71) Applicant: GIVAUDAN SA, Vernier (CH)

(72) Inventors: Sarah El-Habnouni, Jurong (SG); Ian Michael Harrison, Poissy (FR)

(73) Assignee: GIVAUDAN SA, Vernier (CH)

( * ) Notice: Subject to any disclaimer, the term of this patent is extended or adjusted under 35 U.S.C. 154(b) by 164 days.

(21) Appl. No.: 16/768,199

(22) PCT Filed: Dec. 18, 2018

(86) PCT No.: PCT/EP2018/085569
§ 371 (c)(1),
(2) Date: May 29, 2020

(87) PCT Pub. No.: WO2019/121736
PCT Pub. Date: Jun. 27, 2019

(65) Prior Publication Data
US 2020/0290005 A1  Sep. 17, 2020

(30) Foreign Application Priority Data
Dec. 21, 2017 (GB) ..................... 1721584

(51) Int. Cl.
*B01J 13/16* (2006.01)
*C11D 3/50* (2006.01)

(52) U.S. Cl.
CPC ............ *B01J 13/16* (2013.01); *C11D 3/505* (2013.01)

(58) Field of Classification Search
CPC ...................................................... B01J 13/16
See application file for complete search history.

(56) References Cited

U.S. PATENT DOCUMENTS

| 2005/0112152 A1 | 5/2005 | Popplewell et al. |
| 2018/0185808 A1* | 7/2018 | Aussant ............ B01J 13/22 |

FOREIGN PATENT DOCUMENTS

| EP | 0934773 A2 | 8/1999 |
| WO | 2002100525 A2 | 12/2002 |
| WO | 2008098387 A1 | 8/2008 |
| WO | 2013083760 A1 | 6/2013 |
| WO | 2015041791 A1 | 3/2015 |
| WO | 2016177607 A1 | 11/2016 |
| WO | 2017001672 A1 | 1/2017 |

OTHER PUBLICATIONS

International Search Report and Written Opinion of the International Searching Authority for corresponding application PCT/EP2018/085569 dated Mar. 22, 2019.
GB Search Report for corresponding application GB 1721584.9 dated May 16, 2018.
Anand Srinivasan, et al, "Development of a High-Throughput Candida albicans Biofilm Chip", PLoS One, (Apr. 22, 2011), vol. 6, No. 4, doi:10.1371/journal.pone.0019036, p. e19036, XP055567142.

* cited by examiner

*Primary Examiner* — Arrie L Reuther
(74) *Attorney, Agent, or Firm* — Norris McLaughlin PA

(57) ABSTRACT

An encapsulated perfume composition comprising a slurry of core-shell microcapsules in a suspending medium, the core comprising at least one perfume ingredient, and the shell comprising a thermosetting resin formed by the reaction of shell-forming materials selected from monomers, pre-polymers and/or pre-condensates, and wherein the encapsulated perfume composition comprises a polymeric stabilizer that is a reaction product of a polymeric surfactant, and a silane that contains functional groups capable of forming covalent bonds with the shell.

16 Claims, No Drawings

ENCAPSULATED PERFUME COMPOSITIONS AND METHODS OF PREPARING THEM

This is an application filed under 35 USC 371 based on PCT/EP2018/085569 filed 18 Dec. 2018, which in turn is based on GB 1721584.9 filed 21 Dec. 2017. The present application claims the full priority benefit of these prior applications and herein incorporates by reference the full disclosures of these prior applications.

FIELD OF THE INVENTION

The present invention is concerned with an encapsulated perfume composition in the form of a dispersion of core-shell microcapsules. The invention also relates to methods of forming the encapsulated perfume composition, its use in consumer products, as well as consumer products containing same.

BACKGROUND OF THE INVENTION

The demand for encapsulated perfumery across all categories of consumer products, including personal care, household care, and particularly laundry care products continues to grow. As a result, perfumers are required to incorporate perfume-containing microcapsules in ever more diverse product types and in ever more challenging (e.g. aggressive or extractive) media.

This growing customer demand reflects the increasing importance of scent to consumers of personal care, household care and fabric care products. Scent provides an olfactive cue that creates an impression amongst consumers of freshness and cleanliness, which in turn reinforces consumer confidence in the efficacy of such products.

There are many time points during which a consumer will interact with a consumer product before, during and after a cleaning or treatment experience. In the case of laundry products, by way of example, interaction points during a laundry experience will include the freshness experience a consumer receives when opening a container of a fabric care product; or when opening a washing machine or drier after washing or drying laundry; or the experience of freshness associated with ironing, folding or generally handling freshly laundered clothes or linen. If a laundry product can delight consumers during these moments of interaction, it can help transform a laborious chore into a more pleasant experience, and create moments of pleasure that promote brand loyalty and encourage product re-purchase.

The technique of microencapsulation offers the possibility to control the spatio-temporal release of fragrance during a cleaning or treatment experience, thus helping to create the aforementioned consumer benefits.

A wide variety of encapsulating media and perfume ingredients suitable for the preparation of encapsulated perfume compositions has been proposed in the art.

Encapsulating media proposed in the art include synthetic resins made from polyamides, polyureas, polyurethanes, polyacrylates, melamine-derived resins, or mixtures thereof; or naturally-occurring polymers, such as gelatin, starches, and the like.

As for suitable core materials, in principal, all perfume ingredients on a perfumer's palette can be incorporated to some extent into a core-shell microcapsule. However, it is generally accepted that certain physico-chemical characteristics of a perfume ingredient, most notably its c log P, will influence whether and to what extent it can be encapsulated, and once encapsulated, its propensity to remain in the core without substantial leakage during storage.

In the hands of the skilled formulator, the judicious selection of both the shell and core materials can result in microencapsulated perfumery that is stable in many consumer products, and which is able to modulate the release of fragrance over time, to some extent at least.

However, even the use of relatively stable shell chemistries in combination with a well-designed perfume formulation in the core, the formulator is nevertheless faced with a difficult trade-off between ensuring on the one hand that the microcapsules are sufficiently robust as to be stable and not leaky during manufacture and storage, and on the other that they are sufficiently breakable in order to release core contents with a desired release profile in use across wet and dry stages of a cleaning or treatment operation.

One means of facilitating long-lasting perfume performance is to ensure deposition and anchoring of core-shell microcapsules on treated substrates, such as fabrics and keratinous substrates. A microcapsule that is not easily washed-off a treated substrate will be able to exert a pleasant odour impression over a longer period of time.

Accordingly, many attempts have been made to solve this issue and to provide microcapsules that deposit and remain on keratinous surfaces after rinsing. In these attempts, polymers have mainly been used as deposition aids. For example, WO 2015/041791 A1 discloses microcapsules coated with a depositon aid polymer, which is a cationic polymer having a cationic charge of from 0.005 meq/g to 23 meq/g, preferably of from 0.01 meq/g to 12 meq/g, most preferably of from 0.1 meq/g to 7 meq/g at the pH of the composition in which the microcapsules are present. WO 2016/177607 A1 discloses polyurea microcapsules having a non-ionic polysaccharide covalently bonded to the polyurea shell. The polysaccharide is selected from the group consisting of mannan, glucomannan, xyloglucan, hydroxyalkyl cellulose, dextran, glactomannan and mixtures thereof, and are claimed to improve significantly the deposition of the microcapsules on treated substrates. However, although these polymers are intended to enhance the deposition and adherence of microcapsules on various substrates, any enhancement is still limited in rinse-off products. Chemical modification of microcapsules to enhance deposition has its limitations, it seems. Furthermore, any chemical modification of the shell can alter its properties and adversely affect leakage stability.

There remains a need for improved enapsulation technologies that are stable with regard to leakage and yet are more performant in use, not least because they are more substantive on treated surfaces, such as fabric and keratinous surfaces.

SUMMARY OF THE INVENTION

In addressing the problems of the prior art, the applicant discovered that a contributing factor explaining observed limited microcapsule deposition and retention on treated surfaces, particularly under rinse-off conditions is related to the particle size and the polydispersity of microcapsules used in prior art encapsulated perfume compositions. More particularly, core-shell microcapsules are produced conventionally from oil-in-water emulsions, in which the dispersed oil droplets act as templates around which resinous shells are deposited to form slurries of core-shell microcapsules. Such emulsions, which are stabilized by conventional polymeric stabilizers, are typically polydisperse, which results in a population of microcapsules containing significant amounts of microcapsules that are either too large or too small to provide desirable deposition and retention of microcapsules on treated surfaces, particularly under rinse-off conditions.

Applicant has found in a surprising manner new polymeric stabilizers and methods of forming microcapsules, which assist in the control of polydispersity in a population of core-shell microcapsules. Applicant has also found that encapsulated perfume compositions formed using new polymeric stabilizers are substantive on surfaces upon which they are deposited and perform well in consumer products compared with prior art encapsulated perfume compositions.

Furthermore, applicant found that new polymeric stabilizers are so effective in stabilizing the oil-water interface that they help to provide a particularly stable platform on which to deposit not only existing shell chemistries, but also new shell chemistries, around perfume oil droplets to form novel encapsulated perfume compositions, which provide the formulator with greater latitude to design microcapsules with additional functionality or desirable properties, such as microcapsules that are free of residual aldehydes, particularly formaldehyde.

Accordingly, in a first aspect the invention provides an encapsulated perfume composition comprising at least one core-shell microcapsule suspended in a suspending medium, wherein said at least one core-shell microcapsule comprises a core containing at least one perfume ingredient, and a shell surrounding or at least partially surrounding the core, wherein the shell comprises a thermosetting resin formed by the reaction of shell-forming materials selected from monomers, pre-polymers and/or pre-condensates, and wherein the encapsulated perfume composition comprises a polymeric stabilizer that is the reaction product of a polymeric surfactant and a silane containing a functional group capable of forming covalent bonds with the shell.

A second aspect of the invention provides a method of preparing the above encapsulated perfume composition, the method comprising the steps of:

I) Forming an oil-in-water emulsion comprising at least one perfume-containing oil droplet dispersed in an aqueous external phase, and the polymeric stabilizer; and II) Causing shell-forming materials present in the oil-in-water emulsion to react and form at the oil-water interface a thermosetting resin shell surrounding at least partially surrounding said at least one oil droplet.

A third aspect of the invention provides a consumer product, in particular a consumer product suitable for use in rinse-off applications, comprising the encapsulated perfume composition.

A fourth aspect of the invention provides a polymeric stabilizer, which is the reaction product of a polymeric surfactant, and a silane that contains a functional group that is capable of forming a covalent bond with the shell of a core-shell microcapsule.

A fifth aspect of the invention provides the use of the polymeric stabilizer in the preparation of the encapsulated perfume composition.

A sixth aspect of the invention provides the use of the polymeric stabilizer, in the preparation of the encapsulated perfume composition, to control the polydispersity of the core-shell microcapsules, such that the polydispersity of the core shell microcapsules is characterized by a span of less than 1.5, more particularly less than 1.3, still more particularly less than 1.2.

In particular embodiments of any aspect of the invention, the polymeric stabilizer is a copolymer formed by the reaction of an amino-silane and a hydrolyzed copolymer of maleic anhydride.

In particular embodiments of any aspect of the invention, the polymeric stabilizer is formed in-situ during preparation of the encapsulated perfume composition.

In particular embodiments of any aspect of the invention, the shell of the at least one core-shell microcapsule is a thermoset aminoplast resin formed by the reaction of a poly-functional amine and an activated alkene, and more particularly still melamine and an ester of (meth)acrylic acid.

In particular embodiments of any aspect of the invention, the shell of the at least one core-shell microcapsule is a polyurea shell formed by the reaction of a poly-functional amine and at least one isocyanate, in particular two structurally different isocyanates.

In particular embodiments of any aspect of the invention, the encapsulated perfume composition is aldehyde-free, and more particularly formaldehyde-free.

These and other aspects and embodiments of the invention will be further understood in view of the following detailed description of the invention.

DETAILED DESCRIPTION OF THE INVENTION

Core-shell microcapsules are typically obtained by creating an encapsulating shell around oil droplets dispersed in an aqueous phase in the form of an oil-in-water emulsion. These oil-in-water emulsions are typically stabilized by polymeric stabilizers, which may also be referred to as protective colloids or polymeric emulsifiers, and are typically polydisperse. One simple way to determine the polydispersity of an emulsion is to measure the droplet size distribution according to techniques well known in the art, and to calculate the span of this distribution, the span being defined by Equation (1)

$$\text{Span}=[Dv(90)-Dv(10)]/Dv(50). \quad \text{Equation (1)}$$

wherein the Dv(10) value is the volume-average diameter at which 10% of the total droplets volume is comprised of droplets with a diameter less than this value, the Dv(50) value is the median droplet diameter of the volume distribution and corresponds to volume-average diameter at which 50% of the total droplet volume is comprised of droplets with a diameter less than this value, and Dv(90) value is the diameter at which 90% of the sample's volume is comprised of droplets with a diameter less than this value.

Microcapsule size and size distribution can be determined in a manner known in the art. A particular method of measuring particle size is light scattering. Light scattering measurements can be made using a Malvern Mastersizer 2000S instrument and the Mie scattering theory. The principle of the Mie theory and how light scattering can be used to measure droplet size can be found, for example H. C. van de Hulst, Light scattering by small particles. Dover, N.Y., 1981. The primary information provided by static light scattering is the angular dependence of the light scattering intensity, which in turn is linked to the size and shape of the droplets. However, in a standard operation method, the size of a sphere having a size equivalent to the size of the diffracting object, whatever the shape of this object, is calculated by the Malvern proprietary software provided with the apparatus. In case of polydisperse samples, the angular dependence of the overall scattering intensity contains information about the size distribution in the sample. The output is a histogram representing the total volume of droplets belonging to a given size class as a function of the capsule size, whereas an arbitrary number of 50 size classes can be chosen. Thus, the size obtained is referred to as volume-average particle size.

Experimentally, a few drops of slurry are added to a circulating stream of degassed water flowing through a scattering cell. Under such conditions of dilution, the angular distribution of the scattering intensity is measured and analysed by Malvern proprietary software provided with the apparatus to provide the average size and size-distribution of the droplets present in the sample. In the case of an unimodal (monodisperse) droplet distribution the percentiles Dv(10), Dv(50) and Dv(90) are used as characteristics of the droplets size distribution, whereas Dv(50) corresponds to the median of the distribution and is taken as a measure of the volume-average size of the microcapsules.

It is in the nature of the core-shell encapsulation process based on such oil-in-water emulsion template that the size distribution of the microcapsules obtained at the end of the process is substantially the same as the size distribution of the droplets in the emulsion. Hence, solving the polydispersity problem at the level of the emulsion is the determining step in obtaining microcapsules having a low polydispersity.

Attempts to make low polydispersity emulsion droplets using standard prior art emulsification techniques and surfactants/polymeric stabilizers, however, were disappointing as the applicant systematically obtained too broad droplet size distributions by using these techniques. Applicant believes, although does not intend to be bound by theory, that this broad distribution may be attributable to the failure of conventional polymeric stabilizers to provide sufficient stability to the oil-water interface.

Examples of conventional polymeric stabilizers are disclosed in U.S. Pat. No. 8,119,587 and include LUPASOL PA 140 and those copolymers formed from the reaction of ethylenically unsaturated monomers and maleic anhydride, such as ZeMac E400.

In accordance with the present invention, the applicant has discovered novel polymeric stabilizers which possess high emulsification power, which enable very small oil droplets to form with low polydispersity at low agitation speed. Furthermore, the oil-water interface formed appears to offer a very stable platform around which thermoset resin shells can form.

The use of the polymeric stabilizer defined herein enables the production of encapsulated perfume compositions comprising core-shell microcapsules that exhibit at least one, and preferably all of the following attributes:
I. The microcapsules are formed with a perfume loading that is at least 35 wt %, and more particular at least about 40 wt % based on the total weight of slurry (i.e. the microcapsules+the aqueous suspending medium);
II. Perfume can be encapsulated with a very high encapsulation yield, e.g. greater than 90 wt %, and more particularly greater than 95 wt % of the microcapsule is encapsulated perfume;
III. The microcapsules show a stability-to-release performance balance that is comparable to conventional melamine-formaldehyde capsules;
IV. The microcapsules have an average particle size Dv(50) of 30 microns or less, more particularly 20 microns or less, and with a polydispersity characterized by a span of less than 1.5, more particularly less than 1.3, still more particularly less than 1.2. Still further, the aforementioned particle size and polydispersity can be achieved at low to moderate agitation speeds.

The stability-to-release performance of microcapsules can be assessed by performing olfactive assessments, such as those described in Example 6, herein below.

By low to moderate agitation speeds is meant, for example, less than 1000 rpm, more particularly in the order of from about 100 to about 1000 rpm, still more particularly from about 500 to 700 rpm, for example 600 rpm, for a vessel having a volume of 1 liter, equipped with a cross-beam stirrer with pitched bean, and having a stirrer diameter to reactor diameter 0.7.

The stirrer apparatus may comprise a turbine, a Mig stirrer, and the like. The person skilled in the art will however easily understand that such stirring conditions may change depending on the size of the reactor and of the volume of the slurry, on the exact geometry of the stirrer on the ratio of the diameter of the stirrer to the diameter of the reactor diameter ratios. For example, for a Mig stirrer with stirrer to reactor diameter ratio from 0.5 to 0.9 and slurry volumes ranging from 0.5 to 8 tons, the preferable agitation speed in the context of the present invention is from 150 rpm to 50 rpm.

With regard to attribute III), the leakage stability of core-shell microcapsules can be assessed according to techniques well known in the art. A convenient method to assess the stability of microcapsules with respect to leakage in extractive media is described in the examples, herein below.

High microcapsule loading and good stability enables the preparation of encapsulated perfume compositions in a cost effective manner, which can deliver excellent perfume benefits. In particular, the microcapsules exhibit good breakability, which is particularly beneficial in hair care applications when a good post-combing performance is a particularly desirable attribute.

Furthermore, as it is believed that smaller microcapsules deposit with higher efficiency on surfaces, such as the surface of a fabric, the fact that microcapsules of the present invention can be formed with characteristically small particle size and low polydispersity is considered to be particularly advantageous.

The polymeric stabilizers of the present invention stabilize the dispersed oil droplets, by ensuring that the droplets are prevented from coalescing and remain well suspended in the dispersing medium. In this way, the polymeric stabilizer helps assists in the creation of a stable and versatile platform upon which different shell-forming chemistries can be deposited onto perfume oil droplets to form novel core-shell microcapsules.

The polymeric stabilizer of the present invention is the reaction product of a polymeric surfactant and a silane, which silane contains functionality that can form a covalent bond with the shell material. In this manner, the polymeric stabilizer does not only act as an emulsifying agent in the preparation of stable emulsions, it can also act as a covalent linker to help bind the shells to the dispersed oil droplets, resulting in better quality core-shell microcapsules. The functionalization of the polymeric stabilizer, such that it can covalently link to the shell, is a particular feature of the present invention.

Polymeric surfactants that are particularly suitable for the purpose of the present invention include copolymers, which are the reaction product of maleic anhydride and an olefinic monomer, such as ethylene, iso-butylene or styrene. Examples of such copolymers include poly (ethylene-co-maleic anhydride), poly (isobutylene-co-maleic anhydride) and poly (styrene-co-maleic anhydride).

A particularly preferred copolymer is poly (ethylene-co-maleic anhydride), a commercial grade of which is available under the trade name ZeMac E400. The maleic anhydride copolymer may be used singularly or alternatively combinations of maleic anhydride copolymers may be employed.

The maleic anhydride copolymer may be presented for use in the present invention in hydrolyzed form, whereupon the anhydride may be in the form of its free-acid, or its salt, or a mixture thereof.

If a maleic anhydride copolymer is used, it is particularly preferred if it is pre-hydrolyzed before being employed in the emulsification process. Hydrolysis can be achieved by dissolving the maleic anhydride in an aqueous medium, optionally at an elevated temperature, e.g. about 85 to 90° C., for an appropriate time interval. Typically 2 hours is an appropriate time interval to affect hydrolysis. Once the polymer is dissolved under these conditions, the pH of the solution is typically below 3, which can be indicative that hydrolysis has taken place. Furthermore, infrared spectroscopic analysis reveals that the typical absorption bands corresponding to the anhydride group have vanished.

As stated hereinabove, the maleic anhydride copolymer in hydrolyzed form may be presented as its free acid, or its salt form, or a mixture of free acid and salt. The relative amounts of free acid and salt form will depend upon the pH of the aqueous medium. More particularly, the maleic anhydride copolymer is employed in aqueous solution at a pH of from about 2 to about 7, more particularly from about 4 to about 5, where the maleic anhydride copolymer exhibits optimal emulsifier properties.

The maleic anhydride copolymer in hydrolyzed form may be presented as a mixture of its free acid and salt form with monovalent counter-ions, such as lithium, sodium, potassium or ammonium counter-ions.

The silane employed in the preparation of the polymeric stabilizer can be selected from a compound of the Formula I

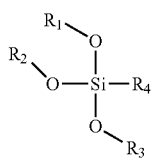

Formula I in which $R_1$, $R_2$ and $R_3$ are independently $C_1$-$C_4$ linear or branched alkyl or alkene, in particular methyl or ethyl, and $R_4$ is a $C_1$-$C_{12}$, preferably a $C_1$-$C_4$, linear or branched alkyl or alkene comprising a functional group. Particularly preferred are aminosilanes. The functional group can thus be an amine, in particular a primary, secondary or tertiary amine.

When the functional group is a primary amine, it can be a terminal primary amine. $R_4$ is then preferably a $C_1$-$C_8$, even more preferably a $C_1$-$C_4$, linear terminal primary aminoalkyl residue. Specific aminosilanes of this category are selected from the group consisting of aminomethyltriethoxysilane, 2-aminoethyltriethoxysilane, 3-aminopropyltriethoxysilane, 4-aminobutyltriethoxysilane, 5-aminopentyltriethoxysilane, 6-aminohexyltriethoxysilane, 7-aminohptyltriethoxysilane and 8-aminooctyltriethoxysilane, most preferably 3-aminopropyltriethoxysilane. The aminosilane and the maleic anhydride copolymer, which react and form the polymeric stabilizer may be combined in widely varying amounts. However, it is preferred if the weight ratio of the polymeric surfactant, and more particularly the maleic anhydride copolymer, to the silane is within the interval of from about 1/0.05 to about 1/1, more particularly from about 1/0.1 to about 1/0.7, still more particularly from about 1/0.3 to about 1/0.4, for example 1/0.33.

Due to the available alkoxy functional groups on the aminosilane, the polymeric stabilizer does not only act as an emulsifying agent in the preparation of stable emulsions, it can also act as a covalent linker to help bind the shells of to the dispersed oil droplets, resulting in better quality core-shell microcapsules.

The functionalization of the polymeric stabilizer, such that it can covalently link to the shell, for example, through poly-condensation of the alkoxysilane moieties is a particular feature of the present invention.

In accordance with the method of the present invention, microcapsules are formed when resinous shells are formed, which surround, or at least partially surround, the emulsion droplets.

In principle, any shell chemistry can be formed around perfume droplets that are stabilized by the polymeric stabilizer of the present invention. The shell chemistry may be conventional, such as melamine formaldehyde, urea formaldehyde, polyurea, or polyacrylate resins.

In particular embodiments of the invention the shell may be formed by the polycondensation of poly-functional amine pre-condensates with aldehydes, and particularly of methylolated melamine and formaldehyde.

In particular embodiments of the invention the shell may be formed by reaction of a poly-functional amine and at least one isocyanate, in particular two structurally different isocyanates.

In other particular embodiments, the shell may be formed by chain growth polymerization via radical chemistry, and in particular the reaction of divinyl benzene (DVB) and (meth) acrylic acid or its esters, such as methyl methacrylate. Microcapsules comprising a thermosetting resin shell comprised of a DVB-co-methyl methacrylate polymer form particular embodiments of the present invention.

In particularly preferred embodiments of the present invention, the shell may be formed by a polyaddition reaction of a shell-forming material containing a plurality of activated olefinic double bonds, with a shell-forming material containing a plurality of nucleophilic functional groups capable of reacting with the activated olefinic double bonds.

The shell-forming material containing the nucleophilic functional groups may be linear or branched aliphatic, aromatic, cyclic-aliphatic, heterocyclic, heteroaromatic, organo-silane, or mixtures of any of the foregoing structures. The material may be monomeric, oligomeric or polymeric. The nucleophilic functional groups may be selected from amino, and in particular primary or secondary amino, thiol, hydroxyl and imino. Particularly preferred such shell-forming materials are poly-functional amines, selected from linear or branched aliphatic amines, or amino-functionalized aliphatic or aromatic heterocycles. Still more particularly, the shell material is a di- or tri-amino-substituted heterocycle selected from melamine (2,4,6-triamino-1,3,5-triazine), 3,5-diamino-1,2,4-triazole, 2,4-diamino-6-phenyl-1,3,5-triazine, or 6-methyl-1,3,5-triazine-2,4-diamine, 1,2-phenylendiamine, 1,3-phenylenediamine or 1,4-phenylenediamine, or mixtures thereof.

Polyimines react also with the olefinic double bonds of the first shell-forming monomer, and are therefore also useful for the preparation of microcapsules of the present invention.

The shell-forming material containing the plurality of activated olefinic double bonds may be any Michael acceptor that is capable of reacting with the afore-mentioned shell-forming material containing a plurality of activated olefinic double bonds. The Michael acceptor may contain the olefinic double bond in conjugation with any suitable electron-withdrawing group, such as nitrile, keto, amido, or ester groups. The shell-forming material may be a monomer, oligomer or a polymer. Particularly preferred shell-forming materials are di-, tri-, or tetra-functional amides or acrylates, although poly-functional acrylates are preferred. Suitable poly-functional acrylates are at least di-functional acrylates, and include, but are not limited to $C_1$-$C_{24}$-alkyl ester(s) of acrylic acid and/or methacrylic acid.

In particular embodiments, the shell-forming monomers may be selected from pentaerythritol-tetraacrylate (PETA); Pentaerythritol triacrylate (PETIA) 1,4-butanediol diacrylate (BDA-2); ethylene glycol dimethacrylate (EDGMA); Trimethylolpropane triacrylate (TMPTA); and Hexane diol diacrylate (HDDA), ((2,4,6-trioxocyclohexane-1,3,5-triyl)tris(oxy))tris(ethane-2,1-diyl)triacrylate (TOCTA), Tris(2-acryloyloxyethyl) Isocyanurate, 1,3,5-triacryloylhexahydro-1,3,5-triazine (TAHHT), or mixtures thereof.

In accordance with preferred embodiments of the invention, the shell-forming monomers are those poly-functional amines described above, and in particular melamine; and the Michael acceptor as described above, is more particularly a poly-functional acrylate. Both the poly-functional amine and the poly-functional acrylate must be at least di-functional, that is, they must contain at least two reactive amino-groups or at least two reactive acrylate groups respectively. Furthermore, at least one of either the poly-functional amine, or poly-functional acrylate must be at least tri-functional to form a cross-linked network.

In preferred embodiments of the present invention, the shell-forming monomers are selected from a poly-functional amine, such as melamine, 1,2-phenylenediamine, 1,3-phenylene diamine and 1,4-phenylediamine, or mixtures thereof, and a poly-functional acrylate, such as Tris(2-acryloyloxyethyl) Isocyanurate and 1,3,5-triacryloylhexahydro-1,3,5-triazine. Without wishing to be bound by any particular theory, it is believed that combinations of any of these particular poly-functional amines and these particular poly-functional acrylates are particularly advantageous, because they may form a flat, and essentially two-dimensional resin structure.

Microcapsules based on this chemistry possess the attributes referred to hereinabove, and are particularly advantageous because they are formaldehyde-free.

In accordance with the process of the present invention, if desired, a functional coating can be applied to the thermoset resin shell of the core-shell microcapsules. A functional coating may entirely or only partially coat the microcapsule shell. Whether the functional coating is charged or uncharged, its primary purpose is to alter the surface properties of the microcapsule to achieve a desirable effect, such as to enhance the deposition of the microcapsule on a treated surface, such as a fabric, human skin, hair, or the like. Functional coatings may be post-coated to an already formed microcapsules, or they may be physically incorporated into the microcapsule shell during the shell formation. They may be attached to the shell by physical forces, physical interactions, such as hydrogen bonding, ionic interactions, hydrophobic interactions, electron transfer interactions, or they may be covalently bonded to the shell.

If the functional coating should be attached to the shell by physical association, the chemical structure of the coating will to some extent be determined by its compatibility with the shell chemistry, since there has to be some association to the microcapsule shell.

If the functional coating should be covalently bound to the shell, this may be facilitated by incorporating into the shell, materials bearing functional groups that are able to react with the coating material.

For example, if the shell of a core shell microcapsule is prepared, as described herein, using a di, tri-, or tetra-functional (meth)acrylate shell-forming monomer, then any residual acrylate functionality present in the shell associated with acrylate shell-forming monomer that does not react with the poly-functional amine during shell formation, can react with coating material to covalently bind the latter to the shell.

Suitable coating materials may be based on polysaccharides, polypeptides, polycarbonates, polyesters, polyolefinic (vinyl, acrylic, acrylamide, polydiene), polyester, polyether, polyurethane, poly-oxazoline, poly-amine, silicone, poly-phosphazine, poly-aromatic, poly-heterocyclic and the like. A more detailed list of coating materials that can be used to coat the microcapsules can be found in the patent literature, for example EP 1,797,947, which discloses coating materials that can be employed as deposition aids, are herein incorporated by reference.

Particularly preferred coating materials may be selected from the group consisting of polymethyl methacrylate, polydimethylaminoethylmethacrylate, polybutyl methacrylate, polydiallydimethylammonium chloride, and mixtures thereof.

If the coating material is a polymer, it can be generated in-situ during the coating process by the polymerization of coating material monomers that contain olefinic double bonds. More particularly, suitable monomers can be added to a slurry of core-shell microcapsules formed according to a process described herein and caused to polymerize as well as react with the aforementioned residual acrylate functional groups in the shell, in order to build-up polymeric coating material that is covalently bound to the shell, and which at least partially coats it.

Suitable monomers for this purpose include but are not limited to acrylates, such as methyl methacrylate, butyl methacrylate, methacrylic acid, dimethylaminoethyl methymethacrylate (DMAEMA), and diallydimethylammonium chloride (DADMAC).

The invention will be further understood with reference to a description of processes for obtaining the above encapsulated perfume compositions, which processes, as well as encapsulated perfume compositions made according to these processes, represent additional aspects of the present invention.

In a particular aspect the invention provides a method of forming the encapsulated perfume composition described herein comprising at least one core-shell microcapsule dispersed in a dispersing medium, wherein said method comprises the steps of:
  I. Forming an oil-in-water emulsion comprising at least one perfume-containing oil droplet dispersed in an aqueous external phase, in the presence of the polymeric stabilizer; and
  II. Causing shell-forming materials present in the oil-in-water emulsion to react and form at the oil-water interface a thermosetting resin shell surrounding or at least partially surrounding said at least one perfume-containing oil droplet; and
  III. Optionally at least partially coating the core-shell microcapsules with a functional coating material.

In carrying out step I), in embodiments of the invention the polymeric stabilizer may be formed in-situ, and more particularly during or after the emulsification step and before the encapsulation step.

The in-situ generation of the polymeric stabilizer is carried out by reacting together the polymeric surfactant and the silane, both defined hereinabove.

The appropriate stirring speed and geometry of the mixer can be selected in order to obtain the desired average droplet size and droplet size distribution. It is a characteristic of the present invention that the polymeric stabilizer has particularly high surfactant power and is able to promote the formation of dispersed oil droplets with desirable small droplet size and low polydispersity.

It is a characteristic of the process of the present invention that, in a one-liter vessel, equipped with a cross-beam stirrer with pitched beam, and having a stirrer diameter to reactor diameter of about 0.7 having, microcapsules can be formed having an average particle size D(50) of 30 microns or less, more particularly 20 microns or less, and with a polydispersity span of less than 1.5, more particularly less than 1.3, still more particularly less than 1.2, at a stirring speed of less than 1000 rpm, more particularly in the order of from about 100 to about 1000 rpm, still more particularly from about 500 to 700 rpm, for example 600 rpm using a turbine, a cross-beam stirrer with pitched beam, such as Mig stirrer, or the like. Preferably, a Mig stirrer is used operating at a speed of 600±50 rpm. The person skilled in the art will however easily understand that such stirring conditions may change depending on the size of the reactor and of the volume of the slurry, on the exact geometry of the stirrer on the ratio of the diameter of the stirrer to the diameter of the reactor diameter ratios. For example, for a Mig stirrer with stirrer to reactor diameter ratio from 0.5 to 0.9 and slurry volumes ranging from 0.5 to 8 tons, the preferable agitation speed in the context of the present invention is from 150 rpm to 50 rpm.

In the formation of the oil-in-water emulsion, the maleic anhydride copolymer is added to the aqueous external phase, and the aminosilane is admixed with the oil phase. Their separation is a process optimization consideration to control the rate of hydrolysis of the silane and to ensure that the silane and the maleic anhydride copolymer react at the oil-water interface in an optimal fashion to form the polymeric stabilizer in-situ. If the silane is allowed to hydrolyze too rapidly it is prone to self-condense. Employing the silane in the oil phase promotes its reaction with the polymeric surfactant at the oil-water interface, rather than undergoing self-condensation.

In order to provide optimal reaction conditions for the coupling of the aminosilane and the maleic anhydride, the pH of the mixture is raised to about 3.5 to 7, for example 4.5 or 6. This can be achieved by the addition of a suitable base. For this purpose, a dilute solution (20%) of ammonia is suitable, although other bases could be employed, such as dilute sodium hydroxide. The whole process can be carried out over a period of about 1 hour to 3 hours, more particularly 2 hours±0.5 hours, and at ambient, or slightly elevated temperature, e.g. 35±5° C. The polymeric stabilizer formed in-situ in this way becomes associated at the oil-water interface to form an at least partial layer around the oil droplets, stabilizing them and preventing coalescence.

The dispersed oil droplets stabilized with the polymeric stabilizer form versatile platforms upon which different shell-forming chemistries can be deposited to form novel core-shell microcapsules.

Although a wide variety of shell chemistries can be applied to the oil droplets to form core-shell microcapsules with a variety of different chemistries, for the purpose of further illustrating the invention processes of forming preferred shell chemistries are described hereunder.

Each of the shell-forming monomers may be added before, during or after formation of the oil-in-water emulsion. Furthermore, the shell-forming monomers may be added simultaneously, separately, or sequentially to the reaction mixture.

The shell-forming monomers in the oil-in-water emulsion are caused to react by adjusting the physical and/or chemical conditions within the emulsion. For example, the pH and temperature of the oil-in-water emulsion can be adjusted. Depending of the chemistry used, the pH may be maintained in the acidic domain, for example between 2.5 and 7, for example 4±0.2. Alternatively, the pH may be raised above neutral; for example within an interval of about 7.5 to about 10, more particularly about 8 to about 9, and still more particularly 8.5±0.2. The pH adjustment step can be effected with additions of appropriate amounts of a suitable acid or base, which may be in the form of a dilute solution (for example 10 or 20%) of hydrochloric acid or ammonia, but other acids and bases could be used. Alternatively, an increase of the reactor temperature may be used to trigger the reaction. In order to avoid any undesired premature reaction of the shell-forming monomers, it is particularly preferred if the adjustment of the pH and/or the increase of temperature takes place after addition of the shell-forming monomer, such as the shell-forming monomer containing the plurality of olefinic double bonds, which typically would be the poly-functional acrylate.

In addition to increasing the pH of the oil-in-water emulsion, the temperature of the emulsion can be elevated to a reaction temperature of about 40° C. to about 100° C., more particularly of about 50 to 95° C., still more particularly of about 70 and 90° C., for example 80±5° C. Heating can be maintained for a period of time sufficient to at least partially cause the shell-forming monomers to react at the oil-water interface to form shells of thermosetting resin around the dispersed oil droplets, and thereby form an encapsulated composition in the form of a slurry of core-shell microcapsules. The time interval maintained at this elevated temperature may range from about 1 to 10 hours, more particularly for 2 to 6 hours, still more particularly from 2.5 to 4 hours, for example 3 hours.

The time taken to reach the reaction temperature may vary within an interval of about 15 minutes to more than 2 hours. Preferably, the time taken is 1.5 hours±0.5 hours.

In accordance with the process described herein, microcapsules can be obtained that exhibit good retention of their core contents, but are also rather frangible. In this way, the microcapsules are sufficiently robust that they exhibit low levels of leakage during storage even in extractive media, but in application a significant proportion can break relatively easily to release their core contents. This is particularly advantageous in encapsulated perfumery applications, and more particularly encapsulated perfumery in laundry applications.

Applicant believes, although does not intend to be bound by particular theory that by operating within the process parameters described herein, including the selection of reagents, and in particular the control of the rate and/or duration of heating in the manner described, it is possible to control the reaction of the shell-forming monomers and create relatively thin and homogenous resinous shells, which resist leakage but which can break in response to only light or moderate shear force.

After formation of the microcapsules, the encapsulated composition can be cooled to room temperature. Preferably the cooling time is at least one hour, more particularly at least 2 hours, for example 2.5 hours±0.5 hours. Slow cooling in this manner is believed that the resin is able to further arrange itself by annealing, which may also affect the homogeneity of the resin shells and therefore contribute to the properties of the microcapsules in application.

Before, during or after cooling, the encapsulated composition may be further processed. Further processing may include treatment of the composition with one or more anti-microbial preservatives, which preservatives are well known in the art. Further processing may also include the addition of a suspending aid, such as a hydrocolloid suspending aid to assist in the stable physical dispersion of the microcapsules and prevent any creaming or coalescence or whatsoever. Any additional adjuvants that may be desired, or conventional in the art may also be added at this time.

The resultant encapsulated composition, presented in the form of a slurry of microcapsules suspended in an aqueous suspending medium may be incorporated as such in a consumer product base. If desired, however, the slurry may be dehydrated to present the encapsulated composition in dry powder form. Dehydration of a microcapsule slurry is conventional, and may be carried out according techniques known in the art, such as spray-drying, evaporation or lyophilization. Typically, as is conventional in the art, dried microcapsules will be dispersed or suspended in a suitable powder, such as powdered silica or the like, which can act as a bulking agent, flow aid, or the like. Such suitable powder may be added to the encapsulated composition before, during or after the drying step.

In accordance with preferred embodiments of the invention, the shell-forming materials are selected from those poly-functional amines described above, and in particular melamine; and a Michael acceptor as described above, and more particularly a poly-functional acrylate. Both the polyamine and the poly-functional acrylate must be at least di-functional, that is, they must contain at least two reactive amino-groups or at least two reactive acrylate groups respectively. Furthermore, at least one of either the polyamine, or poly-functional acrylate must be at least tri-functional.

The case where a poly-functional amine and a poly-functional acrylate are used as shell-forming monomers constitutes a particular process of forming an encapsulated composition of the present invention, which comprises the steps of:

Forming an oil-in-water emulsion comprising a polymeric stabilizer, an oil containing at least one perfume ingredient, and an aqueous phase at a pH of about 3.5 to about 7, for example 4.5 or 6; preferably at an elevated temperature, more particularly 35±5° C.;

Maintaining the emulsion under stirring and at the aforementioned temperature for a period up to about 2 hours or more, for example 2 hours±0.5 hours;

Under stirring, adding the shell-forming monomers comprising a poly-functional amine, more particularly melamine 1,2-phenylenediamine, 1,3-phenylenediamine, or 1,4-phenylenediamine, or a mixture thereof, and a poly-functional acrylate selected from the group consisting of ((2,4,6-trioxocyclohexane-1,3,5-triyl)tris(oxy))tris(ethane-2,1-diyl)triacrylate, Tris(2-acryloyloxyethyl) Isocyanurate, 1,3,5-triacryloylhexahydro-1,3,5-triazine, or mixtures thereof, wherein the poly-functional acrylate is preferably added before the addition of the poly-functional amine;

Adjusting the pH of the emulsion to a pH of about 7.5 to about 10, more particularly between 8 to 9, for example 8.5±0.2 by means of the addition of a base, wherein the pH adjustment is preferably carried out between the addition of the poly-functional acrylate and the poly-functional amine;

Heating the emulsion to a reaction temperature of about 40 to about 100° C., more particularly of about 50 to 95° C., still more particularly of about 70 and 90° C., for example 80±5° C., wherein the temperature is elevated to the reaction temperature over a period of about 15 minutes to about 2 hours and more, for example 1.5 hours±0.5 hour, wherein said heating step may be carried out before, during or after the pH adjustment step;

Maintaining the emulsion at the reaction temperature for a period sufficient to at least partially cause the shell-forming monomers to react at the oil-water interface to form cross-linked resin shells around the dispersed oil droplets, thereby forming a slurry of core-shell microcapsules, wherein the time interval may range from about 0.5 to 10 hours, more particularly for 2 to 6 hours, still more particularly from 2.5 to 4 hours, for example 3 hours;

Cooling the slurry to room temperature, for example over a period of about 15 minutes to about 2 hours and more, for example 2 hour±0.5 hour;

Optionally processing the slurry, before, during or after the cooling step, by adding a microbial preservative, a suspending aid to aid the stable dispersion of the microcapsules in the slurry, and any other adjuvants that may be desired, or conventional in the art; and Optionally dehydrating the slurry to provide the encapsulated composition in the form of a powder.

With regard to the sequence of addition of the shell-forming monomers, the poly-acrylate shell-forming monomer may be added before, during or after formation of the oil-in-water emulsion, although it is preferred if it is added after its formation. Furthermore, it is preferred if this monomer is added after addition of the poly-functional amine shell-forming monomer.

The poly-functional amine may be dissolved in the aqueous phase or employed in solid form, and a process of forming microcapsules and encapsulated compositions containing the same, wherein the poly-functional amine is employed in solid form represents a particular embodiment of the present invention. The applicant found the use of a solid poly-functional amine to be particularly advantageous when the poly-functional amine used as a shell-forming monomer is melamine. It was surprising that melamine in solid form could be used in this way. However, not only was it possible to carry out a poly-addition reaction at the oil-water interface with melamine in solid form, but in not having to dissolve the melamine, an undesirable and industrially impractical dilution step could be avoided. Without intending to be bound by any particular theory, it is believed that solid particles of poorly soluble poly-functional amine, such as melamine, are absorbed or dissolved at the oil-water interface and in this way become available at the locus of the poly-addition reaction with other shell-forming monomers, and the reaction in turn appears to drive the process of absorbing or dissolving the poly-functional amine at the oil-water interface.

The poly-functional amine in solid form may be employed in powder form, or it may be employed as a solid dispersion in an aqueous phase.

If not already incorporated into the oil-in-water emulsion, the shell-forming monomers may be added to the oil-in-water emulsion under stirring in accordance with the sequence of addition referred to hereinabove.

In accordance with another particular embodiment of the invention, the shell-forming monomers are selected from poly-functional amine pre-condensates, more particularly melamine and urea pre-condensates with aldehydes, and particularly formaldehyde. The method of obtaining microcapsules based on such shell-forming monomers is substantially the same as the method described hereinabove for poly-functional amines and poly-functional acrylates, except (i) the pH range of the reaction is in the acidic domain in this case, more particularly between 3 and 6, for example 4.4±0.5. Additionally, in accordance with this particular embodiment, a formaldehyde scavenger may be employed to reduce the level of formaldehyde in the final slurry, wherein the formaldehyde scavenger may be added before, during or after the slurry is cooled down to room temperature.

Alternatively, or additionally, during the formation of a thermosetting resin shell, if desired, a mono-functional acrylate monomer may be added to the reaction mixture. In this way, the mono-functional acrylate monomer becomes embedded in the shell as the shell is in the process of being formed. Although it is possible to add the mono-functional acrylate monomer at the same time as the addition of melamine, preferably it is added at some time after the addition of melamine. More particularly, it is added at some time after the addition of melamine, and before the shell is fully formed.

In accordance with another particular embodiment of the invention, the shell may be formed by chain growth polymerization via free radical chemistry, and in particular the reaction of divinyl benzene (DVB) and (meth)acrylic acid or its esters, such as methyl methacrylate. Microcapsules comprising a thermosetting resin shell comprised of a DVB-co-methyl methacrylate polymer form particular embodiments of the present invention.

The method of obtaining microcapsules based on such free radical polymerization mechanisms is substantially the same as the method described hereinabove for poly-functional amines and poly-functional acrylates, except (i) the pH range of the reaction is in the acidic domain in this case, more particularly between 3 and 6, for example 4.4±0.5, and (ii) the free radical polymerization is triggered by a radical initiator. The initiator may be oil-soluble, such as diazo compounds and diacyl peroxides, or water-soluble, such as metal peroxodisulfate, metal peroxodiphosphates or hydrogene peroxide. In a particular embodiment, both oil-soluble and water-soluble initiators are used.

The case where a poly-functional amine and an isocyanate are used as shell-forming monomers constitutes a particular process of forming an encapsulated composition of the present invention. The process comprises the steps of:

Forming an oil-in-water emulsion comprising a polymeric stabilizer, an oil containing at least one perfume ingredient and an aqueous phase;

Adding to the oil-in-water emulsion at least one polyisocyanate, in particular adding a polyisocyanate (A) and a polyisocyanate (B), which is different from polyisocyanate (A);

Adding to the oil-in-water emulsion at least one polyfunctional amine;

Effecting formation of shells around the droplets of the oil-in-water emulsion to obtain a dispersion of microcapsules.

The oil-in-water emulsion can be formed at a pH from 3.5 to 7, preferably from 4.5 to 6. The formation can be conducted at an elevated temperature, more specifically 35±5° C. The oil-in-water emulsion can optionally be maintained under stirring and at the aforementioned temperature for a period up to about 2 hours or more, for example 2 hours±0.5 hours.

Organic isocyanates are compounds in which an isocyanate group is bonded to an organic residue (R—N=C=O or R—NCO). In the context of the present invention, polyisocyanates (or polyfunctional isocyanates) are organic isocyanates with two or more (e.g. 3, 4, 5, etc.) isocyanate groups in a molecule. Suitable polyisocyanates are, for instance, aromatic, alicyclic or aliphatic.

Anionically modified polyisocyanates comprise at least two isocyanate groups and at least one functional group which is anionic or anionogenic. An "anionogenic functional group" is a group which can become anionic depending on the chemical environment, for instance the pH. Suitable anionic or anionogenic groups are, for instance, carboxylic acid groups, sulfonic acid groups, phosphonic acids groups and salts thereof.

Anionically modified polyisocyanate (A) can comprise one or more sulfonic acid group or salts thereof. Suitable salts can be sodium, potassium or ammonium salts. Ammonium salts are preferred.

Preferably, anionically modified polyisocyanate (A) is obtained by reaction of a polyisocyanate with 2-(cyclohexylamino)-ethanesulfonic acid and/or 3-(cyclohexylamino)-propanesulfonic acid.

More preferably, anionically modified polyisocyanate (A) is obtained by reaction of a polyisocyanate with 2-(cyclohexylamino)-ethanesulfonic acid and/or 3-(cyclohexylamino)-propanesulfonic acid, wherein the polyisocyanate is selected from hexamethylene diisocyanate, tetramethylene diisocyanate, isophorone diisocyanate, dicyclohexylmethane-4,4'-diisocyanate, 2,4- and 2,6-toluylene diisocyanate and isomer mixtures thereof, diphenylmethane diisocyanates, biurets, allophanates and/or isocyanurates of the before-mentioned polyisocyanates.

Anionically modified polyisocyanate (A) can be selected in each case from anionically modified hexamethylene diisocyanate, isophorone diisocyanate, dicyclohexylmethane-4,4'-diisocyanate, the isocyanurate of hexamethylene diisocyanate and mixtures thereof.

Preferably, anionically modified polyisocyanate (A) has:

an average isocyanate functionality of at least 1.8, a content of isocyanate groups (calculated as NCO; molecular weight=42) of 4.0 to 26.0 wt. %, a content of sulfonate groups (calculated as $SO_3$; molecular weight=80) of 0.1 to 7.7 wt. % and optionally a content of ethylene oxide units bonded within polyether chains (calculated as $C_2H_2O$; molecular weight=44) of 0 to 19.5 wt. %, wherein the polyether chains contain a statistical average of 5 to 55 ethylene oxide units.

In particular, anionically modified polyisocyanate (A) can be selected from an anionically modified hexamethylene diisocyanate, an anionically modified hexamethylene diisocyanate, an anionically modified isocyanurate of hexamethylene diisocyanate and mixtures thereof.

In a particularly preferred embodiment, anionically modified polyisocyanate (A) can be according to Formula II.

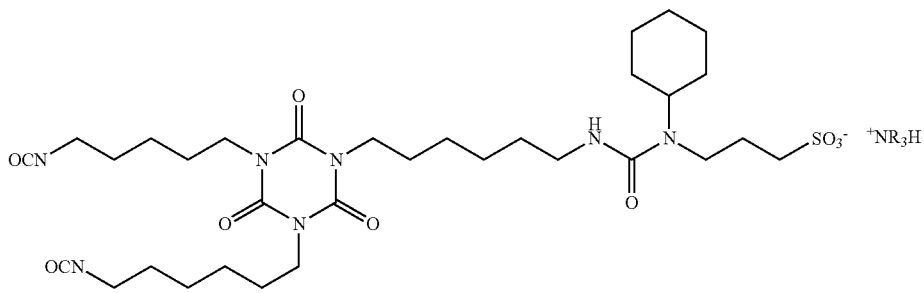

Formula II

Formula II shows a commercially available anionically modified polyisocyanate, which is a modified isocyanurate of hexamethylene diisocyanate, sold by Covestro under the trademark Bayhydur® XP2547.

In a process according to the present invention, polyisocyanate (B) can be a non-ionic polyisocyanate.

The non-ionic polyisocyanate can be selected from the group consisting of 1,6-diisocyanatohexane, 1,5-diisocyanato-2-methylpentane, 1,5-diisocyanato-3-methylpentane, 1,4-diisocyanato-2,3-dimethylbutane, 2-ethyl-1,4-diisocyanatobutane, 1,5-diisocyanatopentane, 1,4-diisocyanatobutane, 1,3-diisocyanatopropane, 1,10-diisocyanatodecane, 1,2-diisocyanatocyclo-butane, bis(4-isocyanatocyclohexyl)methane, 3,3,5-trimethyl-5-isocyanatomethyl-1-isocyanatocyclohexane, isophorone diisocyanate (IPDI), hexamethylene 1,6 diisocyanate (HDI), hydrogenated 4,4 diphenyl methane diisocyanate (HMDI).

Polyisocyanate (B) can also be a non-ionic oligomer based on the above-mentioned isocyanate monomers, such as for example the homopolymer of 1,6-diisocyanatohexane. All those monomers and oligomers are sold under the trade name Desmodur® by Covestro AG.

Preferably, non-ionic polyisocyanate (B) is selected from hexamethylene diisocyanate, tetramethylene diisocyanate, dicyclohexylmethane-4,4'-diisocyanate, 2,4- and 2,6 toluylene diisocyanate and isomer mixtures thereof, 2,4'- and 4,4'-diphenylmethane diisocyanate and isomer mixtures thereof, xylylene diisocyanate (for example Desmodur® quix 175 sold by Covestro), optionally as a trimethylolpropane (TMP) adduct (for example commercially available under the trademark Takenate™ D-110N), the biurets, allophanates and/or isocyanurates of the afore-mentioned polyisocyanates or mixtures thereof.

A preferred commercially available non-ionic polyisocyanate (B) is dicyclohexylmethane diisocyanate, in particular sold by Covestro AG under the trademark Desmodur® W1.

A preferred commercially available non-ionic polyisocyanate (B) is hexamethylene diisocyanate, in particular sold by Covestro AG under the trademark Desmodur® N3200.

A preferred commercially available non-ionic polyisocyanate (B) is isophorone diisocyanate, in particular sold by Covestro AG under the trademark Desmodur® Z.

These polyisocyanates have the advantage of being non-aromatic and therefore more sustainable and less prone to oxidation, while still having high reactivity with polyamines and suitable molecular structure for the formation of impervious encapsulating resins.

In a preferred embodiment of the present invention, the anionically modified polyisocyanate (A) is selected from anionically modified hexamethylene diisocyanate, anionically modified isophorone diisocyanate, anionically modified dicyclohexylmethane-4,4'-diisocyanate, the anionically modified isocyanurate of hexamethylene diisocyanate and mixtures thereof and the non-ionic polyisocyanate (B) is selected from hexamethylene diisocyanate, isophorone diisocyanate, dicyclohexylmethane-4,4' diisocyanate, the isocyanurate of hexamethylene diisocyanate and mixtures thereof.

The weight ratio of anionically modified polyisocyanate (A) to non-ionic polyisocyanate (B) can be in the range from 10:1 to 1:10, more preferably in the range from 1:1 to 1:5 and in particular in the range from 1:2 to 1:4. These weight ratios provide resins having the highest imperviousness and therefore the most suitable for encapsulation.

In context of the present invention, the term "polyfunctional amine" denotes amines that comprise at least two groups capable of reacting with NCO groups, wherein at least one of the groups capable of reacting with NCO groups is a primary or secondary amino group. When the polyfunctional amine contains only one primary or secondary amino group, it will contain one or more additional functional groups that are capable of reacting with NCO groups in a polymerisation reaction. The groups of the polyfunctional amines that are reactive toward NCO groups are preferably chosen from hydroxyl groups and primary or secondary amino groups. Reaction of NCO groups with amino groups leads to the formation of urea groups. Reaction of NCO groups with OH groups leads to the formation of urethane groups. However, the reaction with OH groups often requires a catalyst. The amount of polyfunctional amines, which is introduced, is usually in a molar excess relative to the stoichiometric amount needed to convert the free isocyanate groups.

The polyfunctional amine is preferably selected from diamines, triamines, tetramines, and higher order polyfunctional amines, aminoalcohols, melamines, urea, hydrazines, polymeric polyamines, and mixtures thereof.

Suitable diamines are, for example, 1,2-ethylenediamine, 1,3-propylenediamine, 1,4 diaminobutane, 1,5-diaminopentane, 1,6-diaminohexane, 1,3-diamino-1-methylpropane, 1,4-diaminocyclohexane, piperazin or mixtures thereof.

Suitable amino alcohols are, for example, 2-aminoethanol, 2-(N-methylamino)ethanol, 3-aminopropanol, 4-aminobutanol, 1-ethylaminobutan-2-ol, 2-amino-2-methyl-1-propanol, 4 methyl-4-aminopentan-2-ol or mixtures thereof.

Suitable polymeric polyamines are in principle linear or branched polymers that have at least two primary or secondary amino groups. Additionally, these polymers can have tertiary amino groups in the polymer chain.

The polymeric polyamine is preferably selected from polyalkyleneamines, polyvinylamines, polyetheramines and mixtures thereof. More preferably, the polymeric polyamine is selected from polyalkyleneimines, in particular polyethyleneimines.

Preference is given to polymeric polyamines having a weight-average molecular weight of at least 300 g/mol. More preferred are polymeric polyamines having a weight-average molecular weight of from 500 to 2 000 000 g/mol, in particular from 700 to 1 000 000 g/mol, even more particularly from 800 to 500 000 g/mol.

In a preferred embodiment, the polyfunctional amine comprises or consists of at least one polyethyleneimine.

Polyethyleneimines may be short chain polyethyleneimines with the general formula $H_2N(CH_2CH_2NH)_nH$, wherein n is an integer>1 (n=2: diethylenetriamine; n=3: triethylenetetramine; n=4: tetrathylenepentamine). These are sometimes called polyethyleneamines or polyalkylenepolyamines. Polyethyleneimines may also be long chain polyethyleneimines.

In the processes according to the present invention, polyethyleneimines with a molecular weight of at least 500 g/mol, preferably from 600 to 30 000 or 650 to 25 000 g/mol and in particular from 700 to 10 000 g/mol or 850 to 5000 g/mol, are preferably used.

The polyfunctional amine can be a polyethyleneimine containing the following repeat units

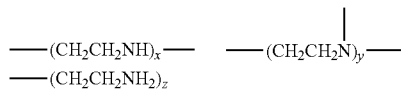

wherein
x is from 8 to 1500, preferably from 10 to 1000;
y is from 0 to 10, preferably from 0 to 5, especially 0;
z is 2+y.

With these polyethyleneimines good results could be achieved, in particular with respect to leakage in extractive media.

Preferred polyethyleneimines are linear polyethyleneimines, wherein x is from 8 to 1500, y is 0 and z is 2.

Preferred commercially available polyethylenimines are sold by BASF SE under the trademark Lupasol®, particularly Lupasol™ G100.

It is preferred to use polyethyleneimine and isocyanate compounds in a weight ratio of 1:1 to 1:5, especially 1:2 to 1:3, or in a dry weight ratio of 1:1 to 1:10, especially 1:4 to 1:6. These weight ratios provide resins having the highest encapsulation efficiency and therefore the most suitable for encapsulation.

Formation of the shells around the droplets can be effected by heating. This can be achieved at a temperature of at least 50° C., preferably at least 60° C., more preferably in a range of from 65° C. to 90° C., in order to ensure sufficiently rapid reaction progress. It may be preferred to increase the temperature continuously or in stages (e.g. in each case by 5° C.) until the reaction is essentially complete. Afterwards, the dispersion may cool down to room temperature.

For formation of the shells around the droplets, the pH of the aqueous phase can be adjusted to a range of from 4 to 8, preferably from 5 to 7, for example around 6. The pH can be adjusted using an inorganic base, for example sodium hydroxide solution, or carbonate buffer salts.

The reaction time typically depends on the nature of the reactive wall-forming materials, the amount of said materials employed, and the temperature used. The period of time for the reaction is ranging from a few minutes to several hours. Usually, microcapsule formation is effected between ca. 60 minutes to 6 h or up to 8 h at the temperatures defined above.

Microcapsules prepared according to a process of the present invention may be coated with a coating material.

In a particular embodiment of the present invention, a coating material can be covalently grafted to the microcapsule shell. The grafting step may be carried out by treating core-shell microcapsules with a coating material that contains functional groups that are reactive with functional groups present in the shells of the core-shell microcapsules, such as for instance any residual unreacted acrylate functional groups of poly-functional acrylate shell-forming monomers.

As stated hereinabove, the coating material may be a pre-formed polymer, which can be covalently grafted to a microcapsule shell. Alternatively, it may be a polymer that is formed in-situ by the polymerization of suitable monomers during the coating process.

Preferably, coating materials are formed from polymerizable monomers that, upon activation, can react with residual acrylate functional groups present in a microcapsule shell. Particular polymerizable monomers suitable for forming coating materials include, but are not limited to, acrylates or methacrylates, such as methyl methacrylate (MMA), dimethylaminoethyl methacrylate (DMAEMA), and butyl methacrylate (BMA), and quaternized compounds containing an olefin group, such as diallyldimethylammonium chloride (DADMAC).

Accordingly, in a particular embodiment of the present invention there is provided a method of forming a microcapsule and an encapsulated composition containing same, said method comprising the steps of:

Forming a microcapsule slurry in accordance with the process described hereinabove;
Adding a polymerizable monomer to the slurry and causing the monomer to both polymerize and react with residual acrylate functional groups contained within the microcapsule shells to form coating material covalently bound to the shells of the core-shell microcapsules.

The formation of the coating material and its grafting to the core-shell microcapsules is preferably carried out at an elevated temperature, e.g. about 50° C. to about 100° C., more particularly from about 55 to 95° C., still more particularly from about 60 to about 90° C., for example 80±5° C. The reaction may be carried out over a period of about 1 hour to about 10 hours, more particularly from about 2 hours to about 8 hours, still more particularly from about 3 hours to about 6 hours. The reaction can be initiated with a free-radical initiator such as 2,2'-azobisisobutyronitrile (AIBN), potassium persulfate, benzoyle peroxide, or any other initiator suitable for such purpose.

The coating material can be a cationic polymer, in particular in cases where the shell of the at least one core-shell microcapsule is a polyurea shell.

In the above method for preparing polyurea microcapsules, a cationic polymer can be added during shell formation, in which case the polymer may participate in shell formation and, for example, be entrapped physically in the shell or be covalently bound to it. The cationic polymer may also be added after shell formation, in which case the polymer does not participate to the shell formation but possibly deposits on the shell surface.

The cationic groups in the cationic polymer can be pH independent. The cationic groups in the cationic polymer can be quaternary ammonium groups.

The cationic polymer can be derived from at least one a monomer bearing quaternary ammonium functionality. In particular, the cationic monomer can be selected from the group consisting of quaternized dimethylaminoethyl acrylate (ADAME), quaternized dimethylaminoethyl methacrylate (MADAME), dimethyldiallyl ammonium chloride (DADMAC), acrylamidopropyltrimethylammonium chloride (APTAC) and methacrylamidopropyltrimethylammonium chloride (MAPTAC).

The cationic polymer can further be additionally derived from a non-ionic monomer selected from the group consisting of water soluble vinyl monomers, more particularly acrylamide, methacrylamide, N-isopropylacrylamide, N,N-dimethylacrylamide, N-methylolacrylamide, N-vinylformamide, N-vinyl acetamide, N-vinylpyridine and/or N-vinylpyrrolidone.

Alternatively, the coating material can be an ampholytic polymer. In the context of the present invention, an "ampholytic polymer" is to be understood as a polymer comprising both cationic and anionic groups, or comprising corresponding ionizable groups. The ampholytic polymer can comprise more cationic groups than anionic groups or groups that can form anions, and as such, can have a net positive charge.

The ampholytic polymer can comprise from 1 to 99 mol % of cationic groups and from 1 to 99 mol % of anionic groups or groups than can form an anion. In a preferred embodiment of the present invention, the ampholytic polymer comprises 2 to 99 mol %, in particular 30 to 95 mol %, and more particularly 60 to 90 mol %, of cationic groups and 1 to 98 mol %, in particular 5 to 70 mol %, and more particularly 10 to 40 mol % of anionic groups or groups than can form an anion.

The ampholytic polymer can be a co-polymer derived from a cationic monomer or a monomer that can form cations, in particular containing at least one quaternary ammonium group, an anionic monomer or a monomer that can form anions, in particular based on acrylic acid, methacrylic acid or a derivative thereof, and optionally a non-ionic monomer. Such polymers offer an optimal combination of being compatible with the shell, having good dispersion efficiency, good flow properties and excellent affinity with the various substrates hereinabove mentioned.

The ampholytic polymer can be derived from a monomer selected from the group consisting of acrylic based monomers, including acrylic acid, methacrylic acid, itaconic acid, crotonic acid, maleic acid, fumaric acid and strong-acid monomers, for example monomers with a sulfonic or a phosphonic acid-type function such as 2-acrylamido-2-methylpropane sulfonic acid, vinylsulfonic acid, vinylphosphonic acid, allylsulfonic acid, allylphosphonic acid, styrene sulfonic acid. The acrylic based monomer may also be any water-soluble salts of these monomers wherein the salt is a salt of an alkali metal, an alkaline-earth metal or an ammonium. The most preferred acrylic based monomer is acrylic acid, methacrylic acid, or a water soluble salt thereof.

In a more particular embodiment, the ampholytic co-polymer is a co-polymer of acrylic acid dimethyldiallyl ammonium chloride (DADMAC).

The ampholytic polymer can be prepared using polymerization techniques that are well known to a person skilled in the art. These known polymerization techniques include solution polymerization, gel polymerization, precipitation polymerization, inverse emulsion polymerization, aqueous emulsion polymerization, suspension polymerization and micellar polymerization.

The ampholytic polymer may be employed in an encapsulated fragrance composition according to the present invention in an amount from 1 to 20 wt %, more particularly 2 to 10 wt %, based on the weight of the composition.

The encapsulated perfume composition formed according to the present invention consists of a slurry of core-shell capsules suspended in an aqueous suspending medium, which may contain a level of core-shell capsules on a weight/weight basis within an interval of between 20 and 50% of the slurry. Still further, the core-shell capsules may consist of between about 80 and 95 wt % of encapsulated oil and about 5 and 20 wt % of shell.

The slurry can be used directly as a perfume composition in all manner of consumer products.

Alternatively, the slurry can be dehydrated, by means of any of the known drying techniques, for example by spray-drying, in order to render the encapsulated perfume composition in the form of a dry powder.

Fragrance materials for use in compositions of the present invention may be selected from natural products such as essential oils, absolutes, resinoids, resins, concretes, and synthetic perfume components such as hydrocarbons, alcohols, aldehydes, ketones, ethers, acids, acetals, ketals and nitriles, including saturated and unsaturated compounds, aliphatic, carbocyclic and heterocyclic compounds, or precursors of any of the above.

Examples of preferred perfume ingredients are any of those selected from ADOXAL (2,6,10-trimethylundec-9-enal); AGRUMEX (2-(tert-butyl)cyclohexyl acetate); ALDEHYDE C 10 DECYLIC (decanal); ALDEHYDE C 11 MOA (2-methyldecanal); ALDEHYDE C 11 UNDECYLENIC (undec-10-enal); ALDEHYDE C 110 UNDECYLIC (undecanal); ALDEHYDE C 12 LAURIC (dodecanal); ALDEHYDE C 12 MNA PURE (2-methylundecanal); ALDEHYDE ISO C 11 ((E)-undec-9-enal); ALDEHYDE MANDARINE 10%/TEC ((E)-dodec-2-enal); ALLYL AMYL GLYCOLATE (allyl 2-(isopentyloxy)acetate); ALLYL CYCLOHEXYL PROPIONATE (allyl 3-cyclohexylpropanoate); ALLYL OENANTHATE (allyl heptanoate); AMBER CORE (1-((2-(tert-butyl)cyclohexyl)oxy)butan-2-ol); AMBERMAX (1,3,4,5,6,7-hexahydro-.beta.,1,1,5,5-pentamethyl-2H-2,4a-Methanonaphthalene-8-ethanol); AMYL SALICYLATE (pentyl 2-hydroxybenzoate); APHERMATE (1-(3,3-dimethylcyclohexyl)ethyl formate); BELAMBRE ((1R,2S,4R)-T-isopropyl-1,7,7-trimethylspiro[bicyclo[2.2.1]heptane-2,4'[1,3]dioxane]); BIGARYL (8-(sec-butyl)-5,6,7,8-tetrahydroquinoline); BOISAM BRENE FORTE ((ethoxymethoxy)cyclododecane); BOISI RIS U1S,2R,5R)-2-ethoxy-2,6,6-trimethyl-9-methylenebicyclo[3.3.1]nonane); BORNYL ACETATE ((2S,4S)-1,7,7-trimethylbicyclo[2.2.1]heptan-2-yl acetate); BUTYL BUTYRO LACTATE (1-butoxy-1-oxopropan-2-yl butyrate); BUTYL CYCLOHEXYL ACETATE PARA (4-(tert-butyl)cyclohexyl acetate); CARYOPHYLLENE ((Z)-4,11,11-trimethyl-8-methylenebicyclo[7.2.0]undec-4-ene); CASHMERAN (1,1,2,3,3-pentamethyl-2,3,6,7-tetrahydro-1H-inden-4(5H)-one); CASSYRANE (5-tert-butyl-2-methyl-5-propyl-2H-furan); CITRAL ((E)-3,7-dimethylocta-2,6-dienal); CITRAL LEMAROME N ((E)-3,7-dimethylocta-2,6-dienal); CITRATHAL R ((Z)-1,1-diethoxy-3,7-dimethylocta-2,6-diene); CITRON ELLAL (3,7-dimethyloct-6-enal); CITRONELLOL (3,7-dimethyloct-6-en-1-ol); CITRONELLYL ACETATE (3,7-dimethyloct-6-en-1-yl acetate); CITRONELLYL FORMATE (3,7-dimethyloct-6-en-1-yl formate); CITRONELLYL NITRILE (3,7-dimethyloct-6-enenitrile); CITRONELLYL PROPIONATE (3,7-dimethyloct-6-en-1-yl propionate); CLONAL (dodecanenitrile); CORANOL (4-cyclohexyl-2-methylbutan-2-ol); COSMONE ((Z)-3-methylcyclotetradec-5-enone); CYCLAMEN ALDEHYDE (3-(4-isopropylphenyl)-2-methylpropanal); CYCLOGALBANATE (allyl 2-(cyclohexyloxy)acetate); CYCLOHEXYL SALICYLATE (cyclohexyl 2-hydroxybenzoate); CYCLOMYRAL (8,8-dimethyl-1,2,3,4,5,6,7,8-octahydronaphthalene-2-carbaldehyde); DAMASCENONE ((E)-1-(2,6,6-trimethylcyclohexa-1,3-dien-1-yl)but-2-en-1-one); DAMASCONE ALPHA ((E)-1-(2,6,6-trimethylcyclohex-2-en-1-yl)but-2-en-1-one); DAMASCONE DELTA ((E)-1-(2,6,6-trimethylcyclohex-3-en-1-yl)but-2-en-1-one); DECENAL-4-TRANS ((E)-dec-4-enal); DELPHONE (2-pentylcyclopentanone); DIHYDRO ANETHOLE (propanedioic acid 1-(1-(3,3-dimethylcyclohexyl)ethyl) 3-ethyl ester); DIHYDRO JASMONE (3-methyl-2-pentylcyclopent-2-enone); DIMETHYL BENZYL CARBINOL (2-methyl-1-phenylpropan-2-ol); DIMETHYL BENZYL CARBINYL ACETATE (2-methyl-1-phenylpropan-2-yl acetate); DIMETHYL BENZYL CARBINYL BUTYRATE (2-methyl-1-phenylpropan-2-yl butyrate); DIMETHYL OCTENONE (4,7-dimethyloct-6-en-3-one); DI METOL (2,6-dimethylheptan-2-ol); DIPENTENE (1-methyl-4-(prop-1-en-2-yl)cyclohex-1-ene); DUPICAL ((E)-4-((3aS,7aS)-hexahydro-1H-4,7-methanoinden-5(6H)-ylidene)butanal); EBANOL ((E)-3-methyl-5-(2,2,3-trimethylcyclopent-3-en-1-yl)pent-4-en-2-ol); ETHYL CAPROATE (ethyl hexanoate); ETHYL CAPRYLATE (ethyl octanoate); ETHYL LINALOOL ((E)-3,7-dimethylnona-1,6-dien-3-ol); ETHYL LINALYL ACETATE ((Z)-3,7-dimethylnona-1,6-dien-3-yl acetate); ETHYL OENANTHATE (ethyl heptanoate); ETHYL SAFRANATE (ethyl 2,6,6-trimethylcyclohexa-1,3-diene-1-carboxylate); EUCALYPTOL ((1s,4s)-1,3,3-trimethyl-2-oxabicyclo[2.2.2]octane); FENCHYL ACETATE ((2S)-1,3,3-trimethylbicyclo[2.2.1]heptan-2-yl acetate); FENCHYL ALCOHOL ((1S,2R,4R)-1,3,3-trimethylbicyclo[2.2.1]heptan-2-ol); FIXOLIDE (1-(3,5,5,6,8,8-hexamethyl-5,6,7,8-tetrahydronaphthalen-2-yl)ethanone); FLORALOZONE (3-(4-ethylphenyl)-2,2-dimethylpropanal); FLORHYDRAL (3-(3-isopropylphenyl)butanal); FLOROCYCLENE ((3aR,6S,7aS)-3a,4,5,6,7,7a-hexahydro-1H-4,7-methanoinden-6-yl propionate); FLOROPAL (2,4,6-trimethyl-4-phenyl-1,3-dioxane); FRESKOMENTHE (2-(sec-butyl)cyclohexanone); FRUITATE ((3aS,4S,7R,7aS)-ethyl octahydro-1H-4,7-methanoindene-3a-carboxylate); FRUTONILE (2-methyldecanenitrile); GALBANONE PURE (1-(3,3-dimethylcyclohex-1-en-1-yl)pent-4-en-1-one); GARDOCYCLENE ((3aR,6S,7aS)-3a,4,5,6,7,7a-hexahydro-1H-4,7-methanoinden-6-yl isobutyrate); GERANIOL ((E)-3,7-dimethylocta-2,6-dien-1-ol); GERANYL ACETATE SYNTHETIC ((E)-3,7-dimethylocta-2,6-dien-1-yl acetate); GERANYL ISOBUTYRATE ((E)-3,7-dimethylocta-2,6-dien-1-yl isobutyrate); GIVESCONE (ethyl 2-ethyl-6,6-dimethylcyclohex-2-enecarboxylate); HABANOLIDE ((E)-oxacyclohexadec-12-en-2-one); HEDIONE (methyl 3-oxo-2-pentylcyclopentaneacetate); HERBANATE ((2S)-ethyl 3-isopropylbicyclo[2.2.1]hept-5-ene-2-carboxylate); H EXENYL-3-CIS BUTYRATE ((Z)-hex-3-en-1-yl butyrate); HEXYL CINNAMIC ALDEHYDE ((E)-2-benzylideneoctanal); HEXYL ISOBUTYRATE (hexyl isobutyrate); HEXYL SALICYLATE (hexyl 2-hydroxybenzoate); INDOFLOR (4,4a,5,9b-tetrahydroindeno[1,2-d][1,3]dioxine); IONONE BETA ((E)-4-(2,6,6-trimethylcyclohex-1-en-1-yl)but-3-en-2-one); IRISONE ALPHA ((E)-4-(2,6,6-trimethylcyclohex-2-en-1-yl)but-3-en-2-one); IRONE ALPHA ((E)-4-(2,5,6,6-tetramethylcyclohex-2-en-1-yl)but-3-en-2-one); ISO E SUPER (1-(2,3,8,8-tetramethyl-1,2,3,4,5,6,7,8-octahydronaphthalen-2-yl)ethanone); ISOCYCLOCITRAL (2,4,6-trimethylcyclohex-3-enecarbaldehyde); ISONONYL ACETATE (3,5,5-trimethylhexyl acetate); ISOPROPYL METHYL-2-BUTYRATE (isopropyl 2-methyl butanoate); ISORALDEINE 70 ((E)-3-methyl-4-(2,6,6-trimethylcyclohex-2-en-1-yl)but-3-en-2-one); JASMACYCLENE ((3aR,6S,7aS)-3a,4,5,6,7,7a-hexahydro-1H-4,7-methanoinden-6-yl acetate); JASMONE CIS ((Z)-3-methyl-2-(pent-2-en-1-yl)cyclopent-2-enone); KARANAL (5-(sec-butyl)-2-(2,4-dimethylcyclohex-3-en-1-yl)-5-methyl-1,3-dioxane); KOAVONE ((Z)-3,4,5,6,6-pentamethylhept-3-en-2-one); LEAF ACETAL ((Z)-1-(1-ethoxyethoxy)hex-3-ene); LEMONILE ((2E,6Z)-3,7-dimethylnona-2,6-dienenitrile); LIFFAROME GIV ((Z)-hex-3-en-1-yl methyl carbonate); LILIAL (3-(4-(tert-butyl)phenyl)-2-methylpropanal); LINALOOL (3,7-dimethylocta-1,6-dien-3-ol); LINALYL ACETATE (3,7-dimethylocta-1,6-dien-3-yl acetate); MAHONIAL ((4E)-9-hydroxy-5,9-dimethyl-4-decenal); MALTYL ISOBUTYRATE (2-methyl-4-oxo-4H-pyran-3-yl isobutyrate); MANZANATE (ethyl 2-methylpentanoate); MELONAL (2,6-dimethylhept-5-enal); MENTHOL (2-isopropyl-5-methylcyclohexanol); MENTHONE (2-isopropyl-5-methylcyclohexanone); METHYL CEDRYL KETONE (1-((1S,8aS)-1,4,4,6-tetramethyl-2,3,3a,4,5,8-hexahydro-1H-5,8a-methanoazulen-7-yl)ethanone); METHYL NONYL KETONE EXTRA (undecan-2-one); METHYL OCTYNE CARBONATE (methyl non-2-ynoate); METHYL PAMPLEMOUSSE (6,6-dimethoxy-2,5,5-trimethylhex-2-ene); MYRALDENE (4-(4-methylpent-3-en-1-yl)cyclohex-3-enecarbaldehyde); NECTARYL (2-(2-(4-methylcyclohex-3-en-1-yl)propyl)cyclopentanone); NEOBERGAMATE FORTE (2-methyl-6-methyleneoct-7-en-2-yl acetate); NEOFOLIONE ((E)-methyl non-2-enoate); NEROLIDYLE ((Z)-3,7,11-trimethyldodeca-1,6,10-trien-3-yl acetate); NERYL ACETATE HC ((Z)-3,7-dimethylocta-2,6-dien-1-yl acetate); NONADYL (6,8-dimethylnonan-2-ol); NONENAL-6-CIS ((Z)-non-6-enal); NYMPHEAL (3-(4-isobutyl-2-methylphenyl)propanal); ORIVONE (4-(tert-pentyl)cyclohexanone); PARADISAMIDE (2-ethyl-N-methyl-N-(m-tolyl)butanamide); PELARGENE (2-methyl-4-methylene-6-phenyltetrahydro-2H-pyran); PEONILE (2-cyclohexylidene-2-phenylacetonitrile); PETALIA (2-cyclohexylidene-2-(o-tolyl)acetonitrile); PIVAROSE (2,2-dimethyl-2-pheylethyl propanoate); PRECYCLEMONE B (1-methyl-4-(4-methylpent-3-en-1-yl)cyclohex-3-enecarbaldehyde); PYRALONE (6-(sec-butyl)quinoline); RADJANOL SUPER ((E)-2-ethyl-4-(2,2,3-trimethylcyclopent-3-en-1-yl)but-2-en-1-ol); RASPBERRY KETONE (N112) (4-(4-hydroxyphenyl)butan-2-one); RH U BAFU RAN E (2,2,5-trimethyl-5-pentylcyclopentanone); ROSACETOL (2,2,2-trichloro-1-phenylethyl acetate); ROSALVA (dec-9-en-1-ol); ROSYFOLIA ((1-methyl-2-(5-methylhex-4-en-2-yl)cyclopropyl)-methanol); ROSYRANE SUPER (4-methylene-2-phenyltetrahydro-2H-pyran); SERENOLIDE (2-(1-(3,3-dimethylcyclohexyl)ethoxy)-2-methylpropyl cyclopropanecarboxylate); SILVIAL (3-(4-isobutylphenyl)-2-methylpropanal); SPIROGALBANONE (1-(spiro[4.5]dec-6-en-7-yl)pent-4-en-1-one); STEMONE ((E)-5-methylheptan-3-one oxime); SUPER MUGUET ((E)-6-ethyl-3-methyloct-6-en-1-ol); SYLKOLIDE ((E)-2-((3,5-dimethylhex-3-en-2-yl)oxy)-2-methylpropyl cyclopropanecarboxylate); TERPINENE GAMMA (1-methyl-4-propan-2-ylcyclohexa-1,4-diene); TERPINOLENE (1-methyl-4-(propan-2-ylidene)cyclohex-1-ene); TERPINYL ACETATE (2-(4-methylcyclohex-3-en-1-yl)propan-2-yl acetate); TETRAHYDRO LINALOOL (3,7-dimethyloctan-3-ol); TETRAHYDRO MYRCENOL (2,6- dimethyloctan-2-ol); THIBETOLIDE (oxacyclohexadecan-2-one); TRIDECENE-2-NITRILE ((E)-tridec-2-enenitrile); UNDECAVERTOL ((E)-4-methyldec-3-en-5-ol); VELOUTONE (2,2,5-trimethyl-5-pentylcyclopentanone); VIRIDINE ((2,2-dimethoxyethyl)benzene); ZINARINE (2-(2,4-dimethylcyclohexyl)pyridine); and mixture thereof.

In another particular embodiment, the core-shell microcapsules can encapsulate a cosmetic active ingredient in addition to or instead of perfume ingredients. Preferably, the cosmetic actives have a calculated octanol/water partition coefficient (ClogP) of 1.5 or more, more preferably 3 or more. Preferably, the ClogP of the cosmetic active is from about 2 to about 7.

Particularly useful cosmetic actives may be selected from the group consisting of emollients, smoothening actives, hydrating actives, soothing and relaxing actives, decorative actives, deodorants, anti-aging actives, draining actives, remodelling actives, skin levelling actives, preservatives, anti-oxidants, antibacterial or bacteriostatic actives, cleansing actives, lubricating actives, structuring actives, hair conditioning actives, whitening actives, texturing actives, softening actives, anti-dandruff actives, and exfoliating actives.

Particularly useful cosmetic actives include, but are not limited to hydrophobic polymers, such as alkyldimethylsiloxanes, polymethylsilsesquioxanes, polyethylene, polyisobutylene, styrene-ethylene-styrene and styrene-butylene-styrene block copolymers, and the like; mineral oils, such as hydrogenated isoparaffins, silicone oils and the like; vegetable oils, such as argan oil, jojoba oil, aloe vera oil, and the like; fatty acids and fatty alcohols and their esters; glycolipides; phospholipides; sphingolipides, such as ceramides; sterols and steroids; terpenes, sesquiterpenes, triterpenes and their derivatives; essential oils, such as Arnica oil, Artemisia oil, Bark tree oil, Birch leaf oil, Calendula oil, Cinnamon oil, Echinacea oil, Eucalyptus oil, Ginseng oil, Jujube oil, Helianthus oil, Jasmine oil, Lavender oil, Lotus seed oil, Perilla oil, Rosmary oil, Sandal wood oil, Tea tree oil, Thyme oil, Valerian oil, Wormwood oil, Ylang Ylang oil, Yucca oil and the like.

In an embodiment, the cosmetic active may be selected from the group consisting of Sandal wood oil, such as Fusanus Spicatus kernel oil, Panthenyl triacetate (CAS-No: 94089-18-6), Tocopheryl acetate (CAS-No: 7695-91-2), Tocopherol (CAS-No: 1406-66-2/10191-41-0/2074-53-5/59-02-9/148-03-8/119-13-1/54-28-4), Naringinin (CAS-No: 480-41-1), Ethyl linoleate, Farnesyl acetate, Farnesol, Citronellyl methyl crotonate (CAS-No: 20770-40-5), Ceramide-2 (1-Stearoiyl-C18-Sphingosine, CAS-No: 100403-19-8), and mixtures thereof.

Encapsulated compositions of the present invention may be employed as a delivery system to deliver active ingredients, such as perfumes for use in all manner of consumer products. The term "consumer products" refers in particular to home-care, textile care or personal-care products, such as body care and hair care products.

Encapsulated compositions according to the invention are particularly usefully employed as perfume delivery vehicles in consumer products that require, in order to deliver optimal perfumery benefits, that the microcapsules adhere well to the substrate on which they are applied. Such consumer products include hair shampoos and conditioners, as well as textile-treatment products, such as laundry detergents and conditioners.

There now follows a series of examples that serve to further illustrate the invention.

Example 1

Preparation of Formaldehyde-Free Melamine-Acrylate Microcapsules

In a first example (EXAMPLE 1.1), formaldehyde-free melamine-pentaerythritol tetraacrylate microcapsules were prepared by performing the steps of:
1) Preparing the core composition comprising 3-aminopropyltriethoxysilane by admixing 0.5 g 3-aminopropyltriethoxysilane and 40 g fragrance composition;
2) Emulsifying the core composition obtained in step 1) in a mixture of 35 g water and 15 g aqueous solution of ZeMac E400 at 10 wt % (=1.5 g solid ZeMac E400), by using a cross-beam stirrer with pitched beam operating at a stirring speed of 600 rpm at a temperature of 35±2° C.;
3) Adjusting the pH to 4.4±0.2 with 0.7 g of a 20% $NH_3$ solution in water and maintaining the system at a temperature of 35±2° C. for 1 hour while maintaining stirring as in step 2);
4) Adding 1.1 g of melamine in powder form and 2.9 g of pentaerythritol tetraacrylate (PETA), and then increasing the pH to 8.7±0.2 by addition of 3.8±1 g of 20% $NH_3$ solution in water, while maintaining stirring as in step 2;
5) Heating the mixture obtained in step 2 to 80±5° C. in 1 hours and maintaining this temperature and stirring for 3 hours in order to obtain a slurry of microcapsules;
6) Cooling down the slurry to room temperature during a period of 120 minutes.

The solid content of the slurry was measured by using a thermo-balance operating at 120° C. The solid content, expressed as weight percentage of the initial slurry deposited on the balance was taken at the point where the drying-induced rate of weight change had dropped below 0.1%/min. The solid content of EXAMPLE 1.1 was 45 wt %, based on the total weight of the slurry. The yield of encapsulation, expressed as the ratio of the encapsulated fragrance composition divided by nominal amount of fragrance composition was 100%. The volume average diameter of the capsules was Dv(50)=19 μm.

In another alternative example (EXAMPLE 1.2), the process was carried on as for Example 1.1, but in an additional step 7), 1 g of methyl methacrylate, 3 g of a 4% potassium peroxodisulfate solution in water and 0.2 g azoisobutyronitrile (AIBN) were added to the slurry obtained in step 5) and the methyl methacrylate let to polymerize by free radical polymerization during one hour at 80±5° C., and under continuous stirring. The solid content at 120° C. was 44.7 wt %, based on the total weight of the slurry. The yield of encapsulation was 98% and the volume average diameter of the capsules was Dv(50)=16 μm.

In another alternative example (SAMPLE 1.3), the process was performed as in Example 1.1, but 0.5 g of poly (styrene-co-maleic anhydride) (PSMA), cumene terminated (PSMA), and 10 g of ZeMac E400 solution as used in step 2). The solid content at 120° C. was 45 wt %, referred to the slurry, and the volume average diameter of the capsules was Dv(50)=12 μm.

In a comparative example (EXAMPLE 1.4), the 3-aminopropyltriethoxysilane was omitted and ZeMac E400 was used as conventional emulsifier. No capsules were obtained in this case.

Example 2

Preparation of Aminoplast Microcapsules

Aminoplast microcapsules have been prepared by performing the steps of:
1) Preparing the core composition comprising 3-aminopropyltriethoxysilane by admixing 0.5 g 3-aminopropyltriethoxysilane and 40 g fragrance composition;
2) Emulsifying the core composition obtained in step 1) in a mixture of 35 g water and 1 g aqueous solution of ZeMac E400 at 10 wt % (=1.5 g solid ZeMac E400), by using a cross-beam stirrer with pitched beam operating at a stirring speed of 600 rpm at a temperature of 35±2° C.;
3) Adjusting the pH to 4.4±0.2 with 0.7 g of a 20% $NH_3$ solution in water and maintaining the system at a temperature of 35±2° C. for 1 hour, while maintaining stirring as in step 2);
4) Adding 1.65 g of melamine pre-condensate Luracoll SD and 1.04 g of urea and maintaining the temperature at 35±2° C. for an additional hour under stirring;
5) Increasing the temperature to 88±5° C. over 1 hour and then maintaining this temperature and stirring conditions for another one hour, in order to obtain a slurry of uncoated microcapsules.
6) Adding 1.65 g of Luracoll SD and 3.8 g ethylene urea solution at 30% in water, maintaining the temperature at 88° C. for an addition 10 minutes and then cooling down the slurry to below 40° C. and adjusting the pH of the slurry to 7±0.5 with 2.16 g of a 10 wt % NaOH solution in water, in order to obtain a slurry of aminoplast microcapsules according to the present invention (EXAMPLE 2.1).

The slurry obtained in EXAMPLE 2.1 was characterized as described in Example 1. The solid content of the slurry formed in EXAMPLE 2.1 was 48 wt %. The yield of encapsulation, expressed as the ratio of the encapsulated fragrance composition divided by nominal amount of fragrance composition was 100%. The volume average diameter of the capsules was Dv(50)=13 μm.

In a comparative example (EXAMPLE 2.2), conventional aminoplast microcapsules were prepared according to WO 2017/001672 A1, Example 1.

Example 3

Preparation of acrylate-co-divinylbenzene Microcapsules

Acrylate-co-divinylbenzene microcapsules were prepared by performing the steps of:
1) Preparing the core composition comprising 3-aminopropyltriethoxysilane by admixing 0.56 g 3-aminopropyltriethoxysilane and 40 g fragrance composition;
2) Emulsifying the core composition obtained in step 1) in a mixture of 35 g water and 15 g aqueous solution of ZeMac E400 at 10 wt % (=1.5 g solid ZeMac E400), by using a cross-beam stirrer with pitched bean operating at a stirring speed of 600 rpm at a temperature of 35±2° C., hour while maintaining stirring;
3) Adjusting the pH to 4.4±0.2 with 0.7 g of a 20% $NH_3$ solution in water and maintaining the system at a at a temperature of 35±2° C. for 1 hour;
4) Adding 1.72 g of divinylbenzene, 0.98 g of methyl methacrylate and 0.48 g of azoisobutyronitrile (AIBN) to the slurry, increasing the temperature to 65°±5° C. and maintaining this temperature for 3 hours under stirring;
5) Adding 5.48 g of 4 wt % potassium peroxodisulfate in water and setting the temperature at 85° C. for two additional hours under stirring;
6) Cooling down the slurry to below 40° C. and adjusting the pH of the slurry to 7±0.5 with 10 wt % NaOH solution in water, in order to obtain a slurry of acrylate-co-divinylbenzene microcapsules according to the present invention (SAMPLE 3.1).

The slurry obtained in EXAMPLE 3.1 was characterized as described in Example 1. The solid content of the slurry formed in EXAMPLE 3.1 was 42 wt %. The yield of encapsulation, expressed as the ratio of the encapsulated fragrance composition divided by nominal amount of fragrance composition was 97%. The volume average diameter of the capsules was Dv(50)=10 μm.

In a comparative example (EXAMPLE 3.2), the process of Example 3.1 was repeated, but 3-aminopropyltriethoxysilane was omitted. No capsules were formed in this case.

Example 4

Preparation of Polyurea-Based Microcapsules

Polyurea-based microcapsules were prepared by performing the steps of:
1) Preparing a core composition comprising 3-aminopropyltriethoxysilane by admixing 2.0 g 3-aminopropyltriethoxysilane and 300 g fragrance composition;
2) Emulsifying the core composition obtained in step 1) in 556 g of an aqueous solution of ZeMac E400 at 3 wt % (=556 g solid ZeMac E400ZeMac E400) by using a mechanical stirrer at 900 rpm at a temperature of 35±2° C.;
3) Adjusting the pH to 6.0 by addition of a 10 wt % solution of NaOH in water and maintaining the system stirring as in step 2) at a temperature of 35±2° C. for 1 hour;
4) Adding 2 g of hydrodispersible isocyanate based on hexamethylene diisocyanate (Bayhydur® XP2547, Covestro) and 22 g of diisocyanate 4,4 dicyclohexylmethanediyle (Desmodur® W1, Covestro) to the emulsion and maintaining the system stirring as in steps 2) and 3) at a temperature of 35±2° C. for 30 minutes;
5) Adding 8 g of polyethyleneimine solution (Lupasol® G100, BASF) in one step and heating reaction mixture gradually to 70° C. during 2 h;
6) Adding 12.5 g of a 40 wt % aqueous solution of copolymer of acrylic acid and diallyldimethylammonium chloride (Merquat 281, Lubrizol) and further heating the reaction mixture to 85° C. for 2 h;
7) Adding 10 g of ammonia solution and 3 g hydroxyethylcellulose (Natrosol™ 250HX, Ashland) and cooling down the mixture to room temperature.
8) Adjusting the final pH of the suspension to 4.0±0.2 with citric acid solution (Example 4.1).

The volume average capsule size distribution, obtained with light scattering measurements using a Malvern 2000S instrument, was Dv(50)=18 μm and Dv(90)=27 μm. The Zeta potential was +25 mV.

Example 5

Comparison of Particle Size and Particle Size Distribution

The solid contents and particle size distributions of the capsules obtained in Examples 1 to 4, as measured by light scattering using Mie theory, are reported in the table below. The particle size distribution is given by its Dv(10), Dv(50) and Dv(90) values, wherein the Dv(10) value is the diameter at which 10% of the sample's mass is comprised of capsules with a diameter less than this value, the Dv(50) value is the median capsule diameter and is taken as the volume average capsule size, and Dv(90) value is the diameter at which 90% of the sample's mass is comprised of capsules with a diameter less than this value. The span is defined as (Dv (90)-Dv(10))/Dv(50) and is taken as a coarse measure of polydispersity.

The table shows also the size distribution of the emulsion obtained by performing only step 1) through 3) of EXAMPLE 1, with (EXAMPLE 1.1) and without (EXAMPLE 1.4) 3-aminopropyltriethoxysilane.

| Example | Solid content [wt %] | Dv(10) [μm] | Dv(50) [μm] | Dv(90) [μm] | Polydispersity span |
|---|---|---|---|---|---|
| Emulsion of EXAMPLE 1.1 with ZeMac E400/ aminosilane in situ emulsifier | 25 | 9.8 | 15.2 | 23.3 | 1.5 |
| Emulsion of EXAMPLE 1.4 (comparative example) with ZeMac e400 as conventional emulsifier | 6.1 | 4.6 | 19.1 | 44.6 | 2 |
| EXAMPLE 1.1 | 45 | 11.8 | 18.9 | 29.8 | 0.9 |
| EXAMPLE 1.2 | 44.7 | 9.3 | 15.7 | 26 | 1.1 |
| EXAMPLE 1.3 | 45 | 4 | 12 | 17 | 1.1 |
| EXAMPLE 1.4 (comparative example) with ZeMac E400 as conventional emulsifier | 2 | — | — | — | — |
| EXAMPLE 2.1 | 48 | 7.6 | 13.5 | 23 | 1.1 |
| EXAMPLE 2.2 | 42 | 3 | 18 | 32 | 1.6 |
| EXAMPLE 3.1 | 42 | 5.5 | 9.6 | 15.8 | 1.1 |
| EXAMPLE 3.2 (comparative example) with ZeMac E400 as conventional emulsifier | 0 | — | — | — | — |
| Example 4.1 | n.a. | 5 | 18 | 27 | 1.2 |

As apparent from the span values, the microcapsules obtained by carrying out processes according to the present invention, i.e. using a new emulsifier that is synthesized in situ by reacting 3-aminopropyltriethoxysilane with ZeMac E400 or PSMA, are remarkably monodisperse. Chemically analogous microcapsules can be obtained with ZeMac E400 as a conventional emulsifier (EXAMPLE 2.2), these latter microcapsules are larger and significantly more polydisperse. However, as shown in Examples 1 and 3, alternative chemistries, such as melamine-acrylate chemistry or poly (divinyl benzene-co-methyl methycrylate) chemistry are not feasible if the new emulsifier is replaced by a conventional emulsifier.

This example and Examples 1 to 3 confirms the superiority of modified Zemac and PSMA emulsifiers compared to conventional unmodified ZeMac E400 emulsifier.

Example 6

Comparison of Olfactive Performance of New and Conventional Aminoplast Microcapsules Microcapsules according to the present invention and conventional microcapsules were evaluated in a proprietary unperfumed powder laundry detergent base. 75 g of this base is used in a side-loaded wash machine (20 L capacity, loaded with 1 kg terry towelling); a wash cycle is performed at a temperature of 40° C., followed by spin-drying.

The pre-rub olfactive evaluation was performed on wet laundry directly out of the machine and after 4 hours. For this evaluation, the terry towelling is handled carefully in order to minimize the risk of breaking the microcapsules mechanically. The post-rub olfactive evaluation was performed after line drying the terry towelling for 24 hours at room temperature. This evaluation was performed by gently rubbing one part of the terry towelling on another part of same terry towelling. The olfactive performance (intensity) has been assessed by a panel of 4 experts rated on a scale of 1-5 (1=barely noticeable, 2=weak, 3=medium, 4=strong and 5=very strong). When relevant, qualitative comments on the perceived odour direction were recorded.

| | Intensity at t = 0 (wet fabric) | Intensity after 2 hours (damp fabrics) | Intensity after 24 hours (pre-rub) | Intensity after 24 hours (post-tub) |
|---|---|---|---|---|
| EXAMPLE 2.1 | 3.5 | 3 | 3 | 4 |
| EXAMPLE 2.2 (comparative example) | 2 | 1.5 | 2.5 | 4 |
| EXAMPLE 3.1 | 2.5 | 2 | 1 | 3 |
| EXAMPLE 3.2 (comparative example) | 1 | 0.5 | 1 | 1.5 |
| Example 4.1 | 3.5 | 3 | 2.5 | 4 |

The results show that the aminoplast and polyurea-based microcapsules according to the present invention provide enhanced perfume release on wet and damp fabrics, compared to conventional aminoplast and polyurea-based microcapsules, while keeping comparable pre-rub and post-rub performance on dry fabrics.

We claim:

1. An encapsulated perfume composition comprising at least one core-shell microcapsule suspended in a suspending medium, wherein said at least one core-shell microcapsule comprises a core containing at least one perfume ingredient, and a shell surrounding or at least partially surrounding the core, wherein the shell comprises a thermosetting resin formed by the reaction of shell-forming materials selected from the group consisting of monomers, pre-polymers and pre-condensates, and wherein the encapsulated perfume composition comprises a polymeric stabilizer that is the reaction product of a polymeric surfactant and a silane containing a functional group capable of forming covalent bonds with the shell.

2. An encapsulated perfume composition according to claim 1, wherein the polymeric stabilizer is the reaction product of an aminosilane, and a co-polymer of an ethylenically unsubstituted compound and maleic anhydride.

3. An encapsulated perfume composition according to claim 1, wherein the polymeric stabilizer is a reaction product of 3-aminopropyltriethoxysilane, and at least one compound selected from the group consisting of a poly (ethylene-co-maleic anhydride) and a poly (styrene-co-maleic anhydride).

4. An encapsulated perfume composition according to claim 1, wherein the shell is a thermosetting resin formed by the polycondensation of an alkylated poly-functional amine and an aldehyde.

5. An encapsulated perfume composition according to claim 1, wherein the shell is a thermosetting resin formed by the reaction of a poly-functional amine and a poly-functional acrylate.

6. An encapsulated perfume composition according to claim 5, wherein the poly-functional amine is selected from the group consisting of ethylene diamine, bis(2-aminoethyl) amine, melamine, 3,5-diamino-1,2,4-triazole, 2,4-diamino-6-phenyl-1,3,5-triazine, 6-methyl-1,3,5-triazine-2,4-diamine, 1,2-phenylendiamine, 1,3-phenylenediamine or 1,4-phenylenediamine and mixtures thereof.

7. An encapsulated perfume composition according to claim 5, wherein the poly-functional acrylate is selected from the group consisting of pentaerythritol-tetraacrylate, pentaerythritol triacrylate, 1,4-butanediol diacrylate, ethylene glycol dimethacrylate, trimethylolpropane triacrylate, hexane diol diacrylate, ((2,4,6-trioxocyclohexane-1,3,5-triyl)tris(oxy))tris(ethane-2,1-diyl) triacrylate, tris(2-acryloyloxyethyl) isocyanurate, 1,3,5-triacryloylhexahydro-1,3,5-triazine and mixtures thereof.

8. An encapsulated perfume composition according to claim 1, wherein the shell is a thermosetting resin formed by the reaction of a poly-functional amine and at least one isocyanate.

9. An encapsulated perfume composition according to claim 1, wherein the at least one core-shell microcapsule is at least partially coated with a functional coating material.

10. An encapsulated perfume composition according to claim 9, wherein the functional coating material is covalently bound to the shell of the at least one core-shell microcapsule.

11. An encapsulated perfume composition according to claim 9, wherein the functional coating material is polymethylmethacrylate.

12. A method of preparing an encapsulated perfume composition according to claim 1, the method comprising the steps of:
   a. Forming an oil-in-water emulsion comprising at least one perfume-containing oil droplet dispersed in an aqueous external phase, in the presence of a polymeric stabilizer that is the reaction product of a polymeric surfactant and a silane containing a functional group capable of forming covalent bonds with the shell; and
   b. Causing the shell-forming materials present in the oil-in-water emulsion to react and form at the oil-water interface a thermosetting resin shell surrounding or at least partially surrounding said at least one oil droplet.

13. A method according to claim 12, wherein the polymeric stabilizer is generated in-situ.

14. A method according to claim 13, wherein the in-situ generation of the polymeric stabilizer is effected by the reaction of an amino-silane and a polymeric surfactant that is a co-polymer of an ethylenically unsubstituted compound and maleic anhydride, present in the oil-in-water emulsion.

15. A method according to claim 14, the method comprising the additional step of:
   c. at least partially coating the core-shell microcapsules with a functional coating material.

16. A method of preparing an encapsulated perfume composition according to claim 1, the method comprising the steps of:
   a. Forming an oil-in-water emulsion comprising at least one perfume-containing oil droplet dispersed in an aqueous external phase, in the presence of the polymeric stabilizer that is the reaction product of a polymeric surfactant and a silane containing a functional group capable of forming covalent bonds with the shell;
   b. Causing shell-forming materials present in the oil-in-water emulsion to react, and form at the oil-water interface a thermosetting resin shell encapsulating said at least one oil droplet.

\* \* \* \* \*